United States Patent [19]

Hunt

[11] 4,359,066
[45] Nov. 16, 1982

[54] PIPE COUPLING

[75] Inventor: Charles R. Hunt, Peterlee, England

[73] Assignees: Kefco Precision Engineers (Peterlee) Ltd.; Alpha Process Controls (West Yorkshire) Ltd., both of England

[21] Appl. No.: 110,306

[22] Filed: Jan. 8, 1980

[30] Foreign Application Priority Data

Jan. 11, 1979 [GB] United Kingdom ............... 7901147

[51] Int. Cl.³ .......................................... F16L 37/28
[52] U.S. Cl. ........................... 137/614.06; 251/149.9
[58] Field of Search ............... 137/614.06; 251/149.9

[56] References Cited

U.S. PATENT DOCUMENTS

| | | | |
|---|---|---|---|
| 3,216,744 | 11/1965 | Elboger et al. | 251/149.09 |
| 3,479,005 | 11/1969 | De Graaf | 137/614.06 |
| 3,664,634 | 5/1972 | Guertin et al. | 137/614.06 |
| 3,897,091 | 7/1975 | McMath et al. | 137/614.06 |
| 4,030,524 | 6/1977 | McMath et al. | 251/149.9 |
| 4,102,356 | 7/1978 | Knight | 137/614.06 |
| 4,135,551 | 1/1979 | Knight et al. | 137/614.06 |

FOREIGN PATENT DOCUMENTS 615121  1/1961  Italy ........................ 137/614.06

*Primary Examiner*—A. Michael Chambers
*Attorney, Agent, or Firm*—James C. Wray

[57] ABSTRACT

A dry-break coupling comprising a spigot member and a complementary socket member to be attached to respective ends of two pipes to be coupled; the spigot member carries a valve member which is spring-loaded to close the mouth of the spigot member, and a valve member is carried by said socket member; fastening means are provided to urge the mouth of the spigot member into and secure the mouth in sealing engagement with the socket member, and operating means are provided to urge the socket valve member to close the socket member and alternatively to move the socket valve member forwardly to move the spigot valve member out of engagement with the mouth and so open the valves; first interlocking means are provided to permit actuation of the fastening means only when the spigot member is substantially fully inserted into a socket member, and second interlocking means are provided to permit actuation of said operating means only when said spigot members are secured together in sealing engagement by the fastening means.

17 Claims, 5 Drawing Figures

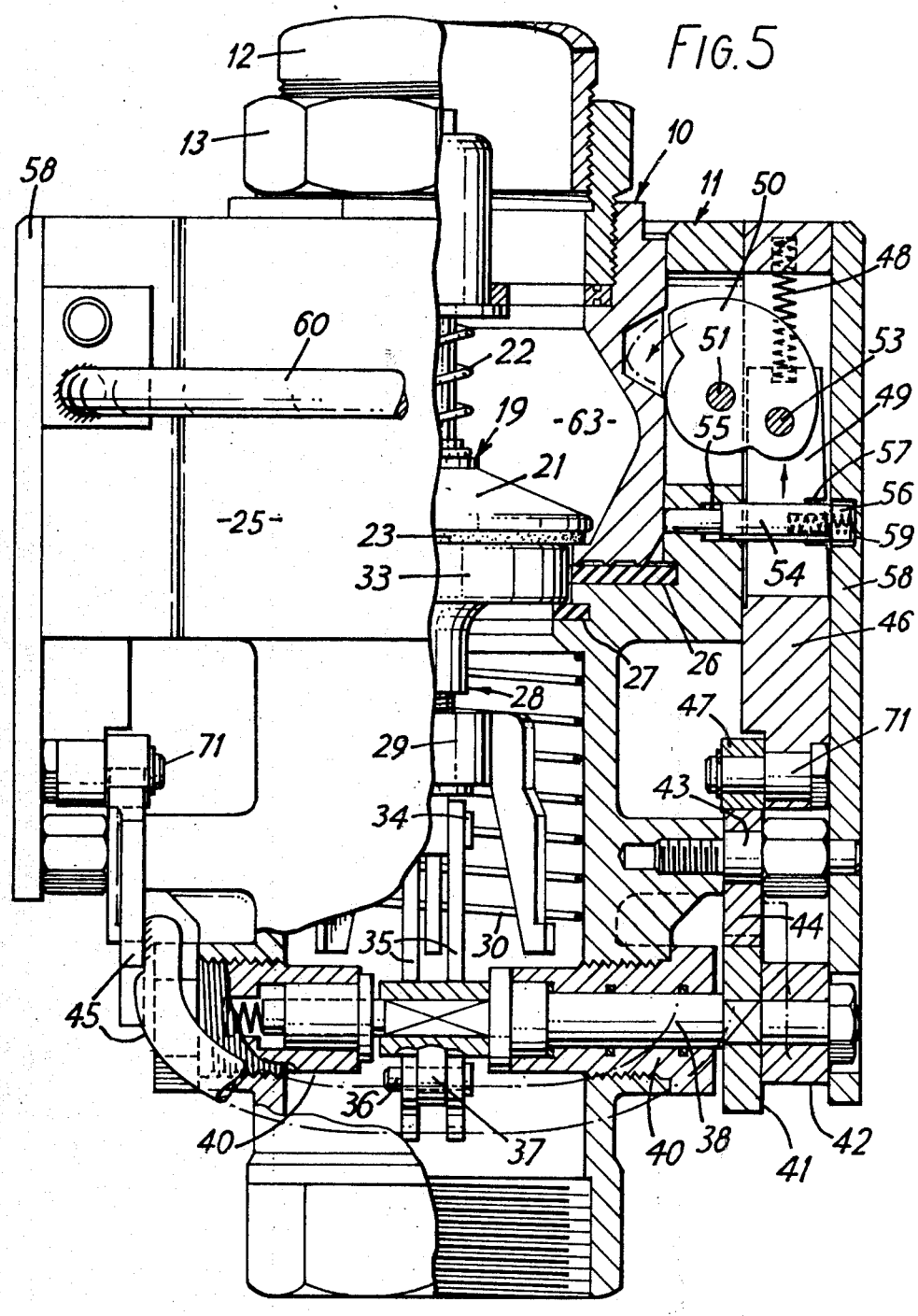

PIPE COUPLING

BACKGROUND OF THE INVENTION

This invention relates to couplings for pipes, hoses and like conduits (herein referred to simply as "pipes") and, more specifically, to so-called dry-break couplings which are used in, for example, the delivery and transfer of toxic, hazardous and dangerous fluids such as benzine and acids.

Various forms of pipe couplings have been proposed with a view to providing for the rapid connection and release of pipes with a minimal loss of the fluid which is being conveyed. Such couplings, when of a very simple nature, usually involve a definite fluid loss on disconnection and may involve the risk of considerable loss due to incorrect opening of the coupling. Safety couplings of various kinds have also been proposed, but these have been of a relatively complicated and sometimes imperfect nature, and it is an object of the present invention to provide a dry-break pipe coupling (i.e. a coupling which can be opened with no or with an acceptably small loss of fluid) which is extremely safe in operation and is relatively simple in construction.

SUMMARY OF THE INVENTION

According to the present invention a dry-break pipe coupling comprises a spigot member and a complementary socket member for attachment to the respective ends of two pipes to be coupled, characterised in that said spigot member has a mouth formed with forwardly-facing and rearwardly-facing annular valve faces and carries a spigot valve member which is spring-loaded towards the rearward valve face of the mouth to close the mouth, said socket member is formed with inner and outer forwardly-facing annular valve seats and carries a socket valve member, fastening means are arranged to urge the mouth of the spigot member into and secure said mouth in sealing engagement with the outer seat of the socket member, operating means are provided to urge the socket valve member into sealing engagement with the inner valve seat of the socket member and alternatively to move the socket valve member forwardly to engage and move the spigot valve member out of engagement with the rearward face of the mouth and so open the valves, first interlocking means are provided to permit actuation of said fastening means only when the spigot member is substantially fully inserted into the socket member, and second interlocking means are provided to permit actuation of said operating means only when said spigot and socket members are secured together in sealing engagement by said fastening means.

Preferably, said first interlocking means comprise one or more spring-loaded members which are displaced against this spring-loading when the spigot member is substantially fully inserted into the socket member, to allow passage of a drive member to operate said fastening means, and said second interlocking means comprise cooperating parts which permit movement of the operating means only when the fastening means have reached a predetermined position.

BRIEF DESCRIPTION OF THE DRAWINGS

FIG. 5 is a front elevation of the socket member shown in FIG. 1, part sectional on the line V—V of FIG. 4.

DESCRIPTION OF A PREFERRED EMBODIMENT

Figure 1:
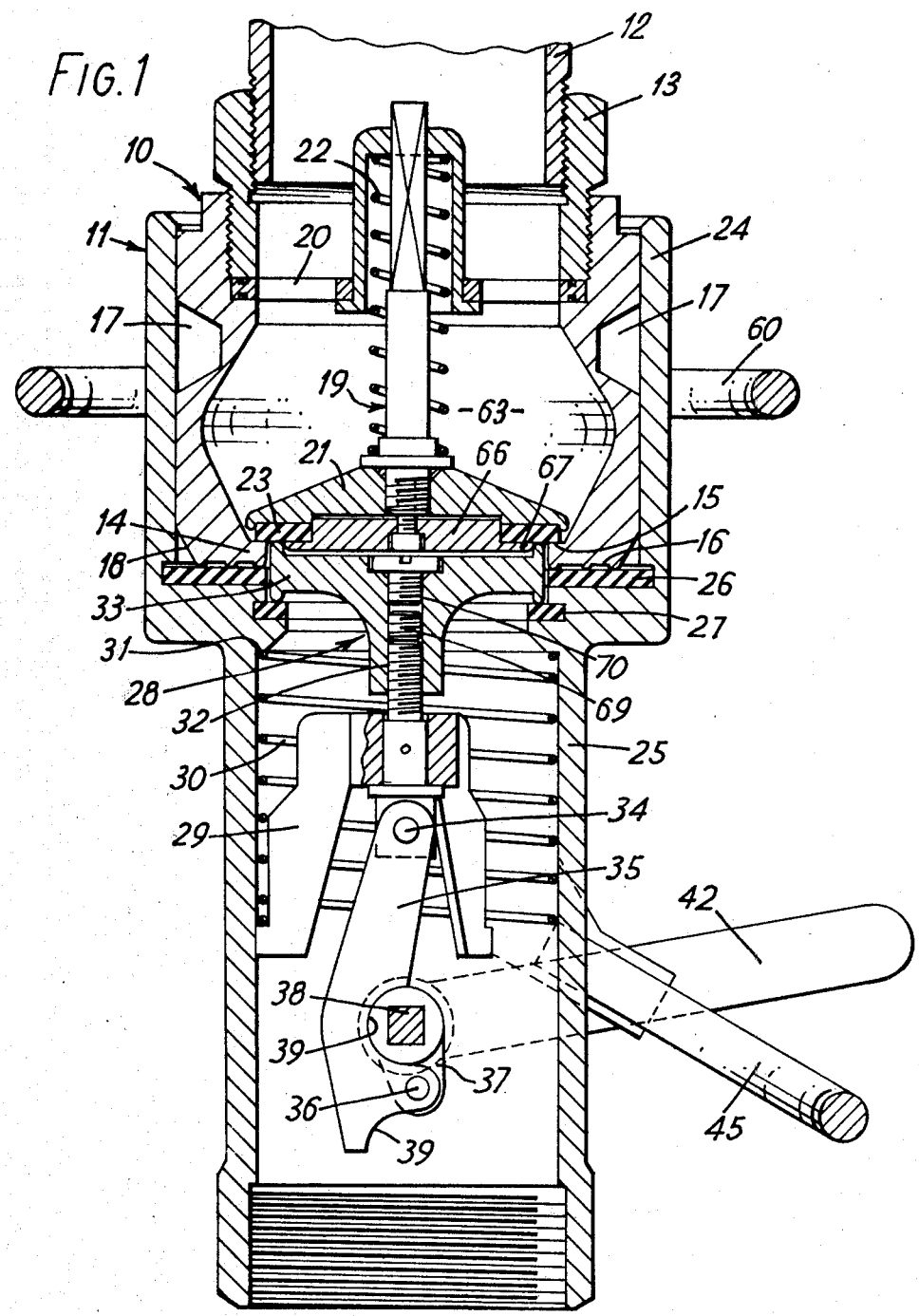
FIG. 1 is a sectional side elevation showing a dry-break coupling according to the present invention, in the closed position before actuation of the fastening means.

Referring to the drawings, the dry-break pipe coupling according to the invention comprises a spigot member 10 and a socket member 11, each receiving an end of the two pipes to be interconnected. Only the delivery pipe end 12 is shown, being secured to the spigot member 10 through a clamping ring 13.

Figure 2:
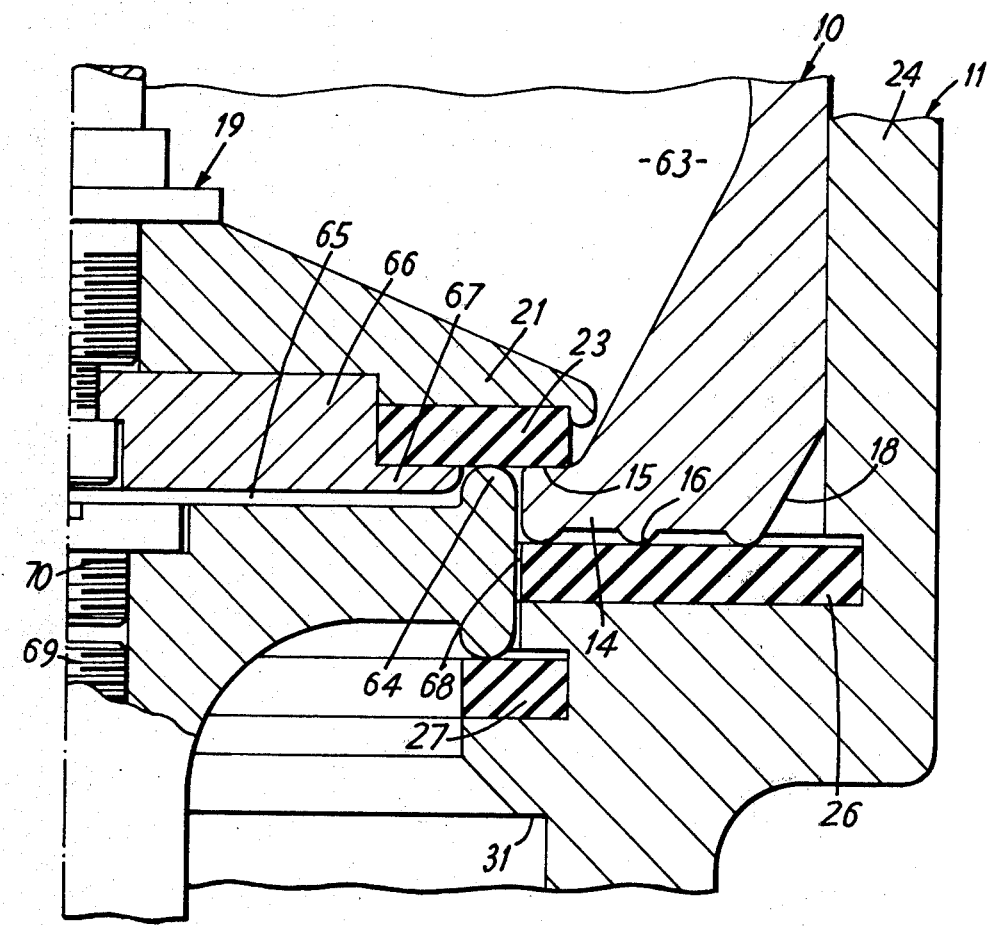
FIG. 2 is a detail view showing parts of valve seats.

The spigot member 10 has a mouth 14 formed with a rearwardly-facing annular valve face 15 and a forwardly-facing annular valve face 16, and is also formed with a peripheral side recess 17 and a tapered forward end face 18. A poppet valve 19 is supported in the spigot member 10 by means of a fixed spider 20, and head 21 of this valve member is urged downwardly by compression spring 22 so that a flat sealing ring 23 on the valve head is urged into sealing engagement with the rear face 15 of the mouth 14. As shown in FIG. 2, the periphery of the valve head is extended downwardly to locate the ring 23 more positively.

The socket member 11 of the coupling comprises a forward section 24 and a rearward section 25. The forward section 24 which receives the spigot member 10, carries a flat sealing ring 26 to be engaged by the front valve face 16 of the spigot mouth, and a flat sealing ring 27 is located in a recess between the forward and rearward sections.

A poppet valve 28 is mounted in the socket member 11 by means of a sliding spider 29, and a compression spring 30 extends between a shoulder 31 on the member 11 and the lower end parts of the three legs of the spider 29. The poppet valve 28 comprises a stem 32 which carries a head 33 at its upper end and has a pivotal connection 34 at its lower end to a pair of connecting plates 35. The lower ends of the plates 35 are connected by a pin 36 to a crank arm 37 on a rotary transverse shaft 38 and are formed with upper and lower recesses 39. The shaft 38 is mounted in opposed bearings 40 in the wall of the rearward section 25 of the socket member 11, as shown in FIG. 5, and carries at one end a shaped disc 41 and an operating handle 42 secured by a shear pin.

Above the rotary shaft 38 are mounted a pair of pivot pins 43 which carry cams 44 and a U-shaped fastening handle 45 is secured at its ends to these cams.

A pair of vertically slidable pillars 46 are mounted one above each cam 44, and a roller 47 carried at the base of each pillar follows its respective cam 44. The pillars 46 are bifurcated at their upper ends and are urged downwardly by springs 48 which engage the upper ends of limbs 49 of the pillars. A pair of driving pawls 50 are mounted on pivot pins 51 in opposed recesses 52 in the wall of forward section 24 of the socket member. The pawls 50 are also pivotally connected to pins 53 which extend between the limbs 49 of the pillars 46.

A pair of spring-loaded pins 54 are mounted for transverse sliding movement in diametrically-opposed shaped bores 55 in the wall of forward section 24 of the socket member, and each pin 54 carries at its outer end a crossbar 56. The crossbars 56 are arranged to enter recesses 57 in the limbs of the pillars 46. Cover plates 58 secured to the section 24 to enclose the pillars 46 and the related parts of the fastening mechanisms, are each formed with a recess 59 adjacent the crossbars 56. The plates 58 extend downwardly to shield and protect the pivot pins 43 and one the spindle 38. A metal bump-ring 60 is mounted on at least one of the cover plates 58 as a guard against damage to the coupling by, for example, being dropped. Alternatively, a bump-ring of solid rubber or other cushioning material may surround the valve body.

Figure 4:
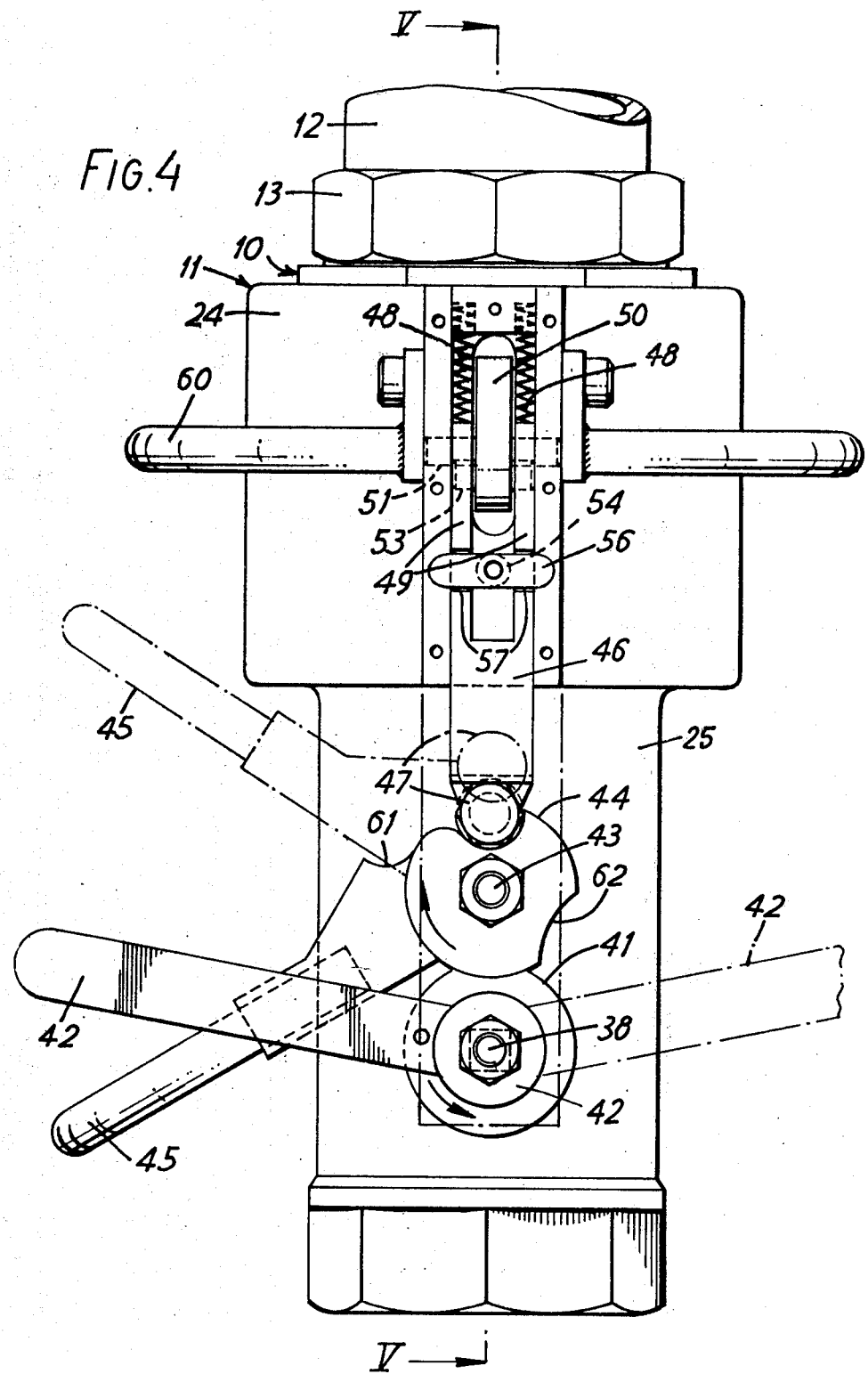
FIG. 4 is an elevation corresponding to FIG. 1, but from the other side.

In a pipe coupling operation, the spigot member 10 is pushed into the forward section 24 of the socket member 11 until the mouth 14 reaches or closely approaches the sealing ring 26. During the final part of this movement, the pins 54 are moved outwardly by the tapering face 18 of the spigot member so that the bars 56 move out of the recesses 57 to enter the adjacent recesses 59 in the cover plates 58 (not shown in FIG. 4) and free the pillars 46. The fastening handle 45 is then moved (clockwise as illustrated in FIG. 4) to the position shown in broken lines, and the consequent movement of cams 44 raises the pillars 46 to turn the pawls 50 (the pawl 50 illustrated in FIG. 5 turning anti-clockwise) so as to enter the recess 17 as indicated in broken lines and force the spigot member 10 downwardly so that the face 16 of mouth 14 sealingly engages the ring 26. It will be noted that the face 16 is formed with annular ribs, which enhances sealing with ring 26 and also reduces the closing force required.

Figure 3:
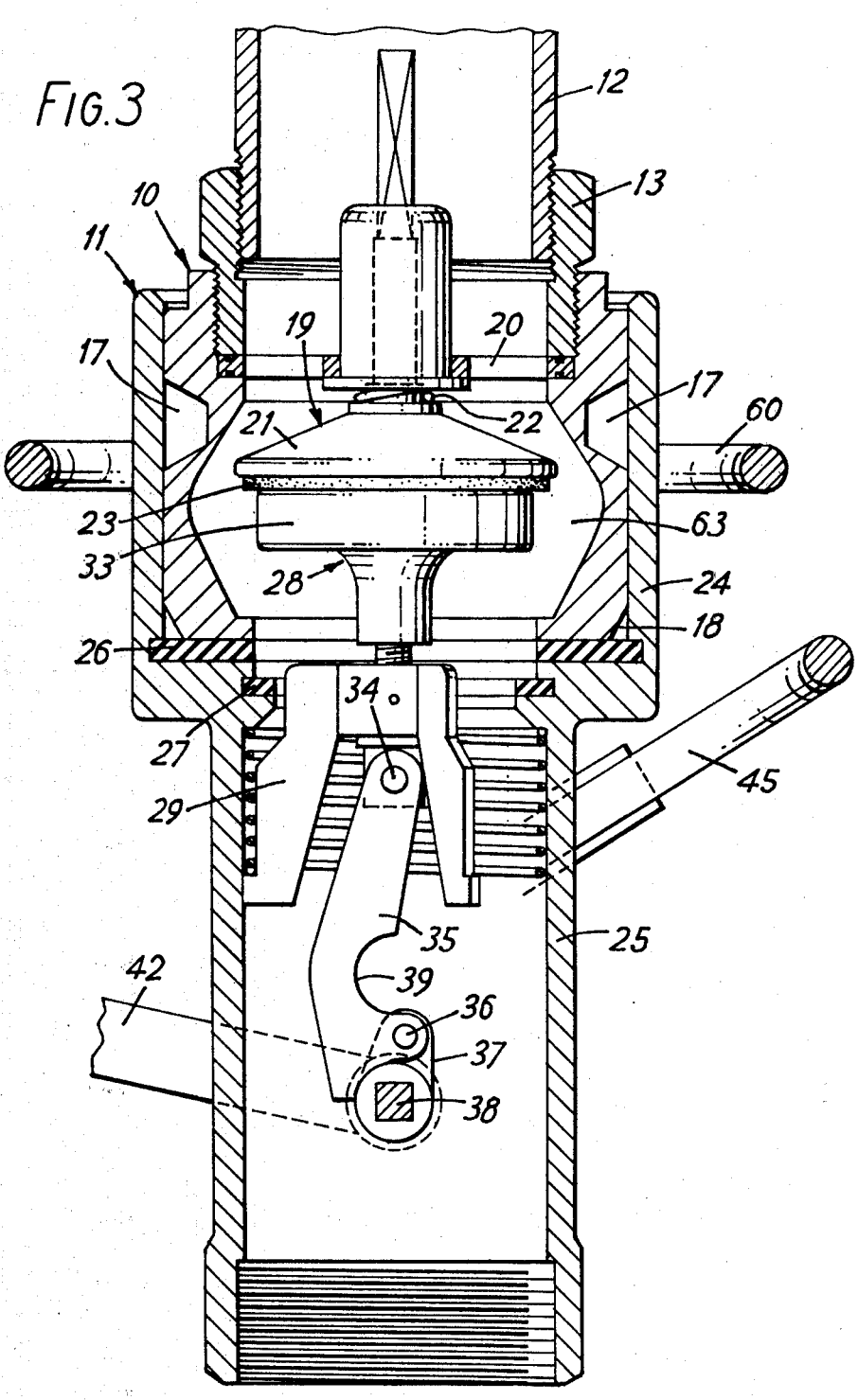
FIG. 3 is a sectional side elevation showing the dry-break coupling in the open position.

The movement of the handle 45 turns the cams 44 until abutment faces 61 engage the rollers 47, and in that position a recess 62 in the right-hand cam 44 (in FIG. 5) then faces the disc 41 which is thus freed to allow the operating handle 42 to be moved. Movement of handle 42 (anti-clockwise in FIG. 4) to the broken-line position rotates the shaft 38 and, through the consequent movement of crank arm 37 and plates 35, raises poppet valve 28. This rotation of shaft 38 moves the upper recesses 39 in plates out of engagement with the adjacent shaft bearing and continues until the lower recesses engage the same bearing. The movement of poppet valve head 33, clear of the sealing ring 27, lifts the poppet valve 19 and, as the valve head 21 with the sealing ring 23 moves clear of the mouth 14, the coupling valve is opened for the throughflow of liquid around the poppet valve heads which, as shown in FIG. 3, are accomodated in a chamber 63 of increased diameter. While liquid is flowing, it is not possible to release the locking pawls 50 as the handle 45 is held in position by recess 62 being entered by disc 41.

As shown in FIG. 2, upper rim 64 on the valve head 33 also engages the sealing ring 23, so that no fluid should enter area 65 between the poppet valve heads 21 and 33. Furthermore, the head 21 carries a clamping disc 66, the extended periphery 67 of which is so shaped as to be engaged by the rim 64 to centralise the poppet valve 19.

To disconnect the coupling members 10 and 11, the handle 42 is returned to its full-line position (FIG. 1) whereby the valve head 33 is poitively returned to its position of sealing engagement with the ring 27, and the valve head 21 returns under the action of its spring 22 and also under fluid pressure to its position of sealing engagement with face 15 of mouth 14. In the position now occupied by the disc 41 (as shown in full lines in FIG. 4), the handle 45 and thus also the locking pawls 50 can be returned to their full-line positions shown in FIG. 5, and the two coupling members 10 and 11 can be safely separated. The only liquid loss on separation should be the minute quantity trapped in the annular space around head 33, indicated at 68, and this amount is negligible in the context of usage of the coupling; as mentioned above, no fluid should have entered the area 65.

The flat form of the sealing rings 23, 26 and 27 allows high closing pressures to be employed, and is also attractive in valves used for conveying corrosive fluids which cause virtually all commonly-used sealing materials to swell. Further to improve the leak-proof characteristics of the coupling, the poppet valve 28 is rendered adjustable by its head 33 being screwed into the stem 32 and locked in position by a grub screw 69 which engages the upper end of the stem and is shielded by a cover screw 70. To this same end, the rollers 47 are carried eccentrically on spindles 71 (FIG. 5) to provide for adjustment of the valve face 16 with the sealing ring 26.

The pipe coupling according to the present invention thus combines the advantages of positive sealing of the separated members with the double interlocking of the exposed handles 42 and 45.

I claim:

1. A dry-break pipe coupling comprising a spigot member and a complementary socket member to be attached to respective ends of two pipes to be coupled, said spigot member having a mouth formed with forwardly-facing and rearwardly-facing annular valve faces and said socket member having inner and outer forwardly-facing annular valve seats, a flat sealing ring at said outer valve seat, a valve member carried by said spigot member and spring-loaded towards the rearward valve face of said mouth to close said mouth, a valve member carried by said socket member, fastening means to urge the forward valve face of the mouth of the spigot member into and secure said face in sealing engagement with the flat sealing ring at said outer valve seat of the socket member, the radially inward edge of the outer valve seat and flat sealing ring being coextensive with the inward edge of the forward valve face, operating means operable separately from said fastening means to urge the socket valve member into sealing engagement with the inner valve seat of the socket member and alternatively to move the socket valve member forwardly to engage and move the spigot valve member out of engagement with the rearward valve face of the mouth and so open the valves, first interlocking means to permit actuation of said fastening means only when the spigot member is substantially fully inserted into the socket member, and second interlocking means to permit actuation of said operating means only when said spigot and socket members are secured together in sealing engagement by said fastening means.

2. A pipe coupling as claimed in claim 1, in which said first interlocking means comprise at least one spring-loaded member which is displaced when said spigot member is substantially fully inserted into a said socket member, and a drive member to operate said fastening means and movable only when said spring-loaded member is displaced.

3. A pipe coupling as claimed in claim 1 or 2, in which said second interlocking means comprise cooperating parts which permit movement of the operating means only when the fastening means have reached a predetermined position.

4. A pipe coupling as claimed in claim 1 or 2, and further comprising a flat sealing ring at said inner valve seat of the socket member, to be engaged by said socket valve member.

5. A pipe coupling as claimed in claim 1 or claim 2, in which said socket valve member has a peripheral rim, and a flat sealing ring is carried by said spigot valve member to be engaged by said peripheral rim.

6. A pipe coupling as claimed in claim 5 in which the periphery of the spigot valve member extends downwardly along at least a portion of the radially outward surface of the flat sealing ring.

7. A pipe coupling as claimed in claim 1 or claim 2, in which said spigot valve member and said socket valve member further comprise co-operating parts to effect centralising of one of these members in relation to the other.

8. A pipe coupling as claimed in claim 1 or claim 2, in which annular ribs are provided on said forward valve face of the mouth of said spigot member.

9. A pipe coupling as claimed in claim 1 or claim 2, and further comprising means for adjusting the closing pressure between the spigot member and the outer valve seat.

10. A pipe coupling as claimed in claim 1 or claim 2, in which at least one cover plate shields portions of the fastening and operating means.

11. A pipe coupling as claimed in claim 1 in which the socket valve member is spring-loaded toward the inner valve seat.

12. A pipe coupling as claimed in claim 1 in which the rearward valve face lies in a plane substantially perpendicular to the axis of the coupling.

13. A pipe coupling as claimed in claim 1 in which the fastening means comprises at least one pawl pivotally mounted in the socket member, a peripheral side recess formed in the spigot member for receiving at least a portion of the pawl when the pawl is pivoted inwardly, and means connected to the pawl for imparting pivotal movement to the pawl.

14. A pipe coupling as claimed in claim 13 in which a surface of the recess slopes toward the outer valve seat in a radially outward direction, said inwardly pivoted pawl bearing against said surface to urge the forward valve face into sealing engagement with the flat sealing ring at said outer valve seat.

15. A pipe coupling as claimed in claim 13 further comprising an axially slideable pillar pivotally connected to the pawl, said pillar being provided with a cam follower, a cam rotatably mounted in abutment with the cam follower, said cam being shaped to impart axial movement to the pillar upon rotation, said axial movement imparting pivotal movement to the pawl.

16. A pipe coupling as claimed in claim 15 in which the first interlocking means comprises a spring-loaded pin mounted on the socket member for transverse movement, the outer end of said pin being provided with a cross bar arranged to enter a recess formed in the pillar to prevent axial movement of the pillar, the spigot member being shaped to engage the pin and impart transverse movement thereto withdrawing the cross bar from the recess only when the spigot member is substantially fully inserted into the socket member.

17. A pipe coupling as claimed in claim 1 or 2, in which said socket member comprises a forward section joined to a rearward section, and said outer valve seat is located at the junction between the sections, said forward section being of extended cylindrical form to receive said spigot member which is of complementary extended cylindrical section.

* * * * *